United States Patent [19]

McSherry et al.

[11] Patent Number: 4,673,150
[45] Date of Patent: Jun. 16, 1987

[54] PLASTIC FASTENERS

[75] Inventors: Thomas W. McSherry, Stamford, Conn.; Nathaniel H. Garfield, Harrison, N.Y.

[73] Assignee: Mechanical Plastics Corp., Pleasantville, N.Y.

[21] Appl. No.: 663,613

[22] Filed: Oct. 22, 1984

[51] Int. Cl.⁴ .............................................. F16L 3/08
[52] U.S. Cl. .................................. 248/73; 248/74.3; 411/913
[58] Field of Search ................ 248/71, 73, 74.1, 74.2, 248/74.3, 231.9, 231.91; 411/913, 508, 509, 523; 24/16 PB, 458, 457, 467, 484; 402/19

[56] References Cited

U.S. PATENT DOCUMENTS

| 2,571,641 | 10/1951 | Wing | 248/73 UX |
| 3,144,695 | 8/1964 | Budwig | 24/16 PB |
| 3,213,746 | 10/1965 | Dwyer | 411/913 X |
| 3,465,992 | 9/1969 | Schuplin | 248/71 |
| 3,595,506 | 7/1971 | Saunders | 248/71 |
| 4,174,910 | 11/1979 | McSherry et al. | 402/19 |
| 4,183,485 | 1/1980 | Gladieux | 248/68.1 |
| 4,264,047 | 4/1981 | Nelson | 248/73 |
| 4,455,715 | 6/1984 | Matsui | 24/16 PB |

FOREIGN PATENT DOCUMENTS

| 1533232 | 6/1968 | France | 248/73 |
| 347632 | 8/1960 | Switzerland | 248/231.91 |
| 875935 | 8/1961 | United Kingdom | 248/73 |
| 1540412 | 2/1979 | United Kingdom | 248/74.3 |

OTHER PUBLICATIONS

Red Head Anchoring Systems Catalog; ITT, Phillips Drill Division, 1980.

Primary Examiner—J. Franklin Foss
Attorney, Agent, or Firm—Pennie & Edmonds

[57] ABSTRACT

One piece, integrally molded fasteners and methods for their use. A harness comprising a base, an elongated flexible strap, and a toggle-type lock for holding a bundle of wires or cables together. A first end of the strap is connected to the base, and the base forms a slot to receive a second end of the strap. A rack hook comprising a channel portion, a hook portion, and a toggle-type lock wherein the hook portion extends upward from and is directly supported by the channel portion. A rope anchor comprising a pair of legs, an annular ring, and a toggle-type lock, wherein the annular ring is integrally connected to top ends of the legs, and the lock is integrally connected to bottom ends of those legs.

37 Claims, 35 Drawing Figures

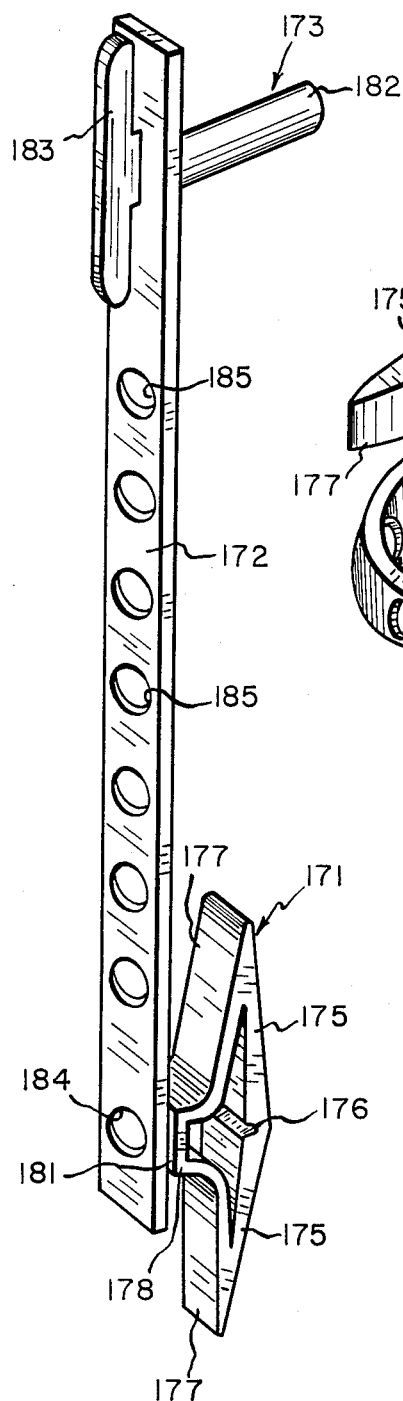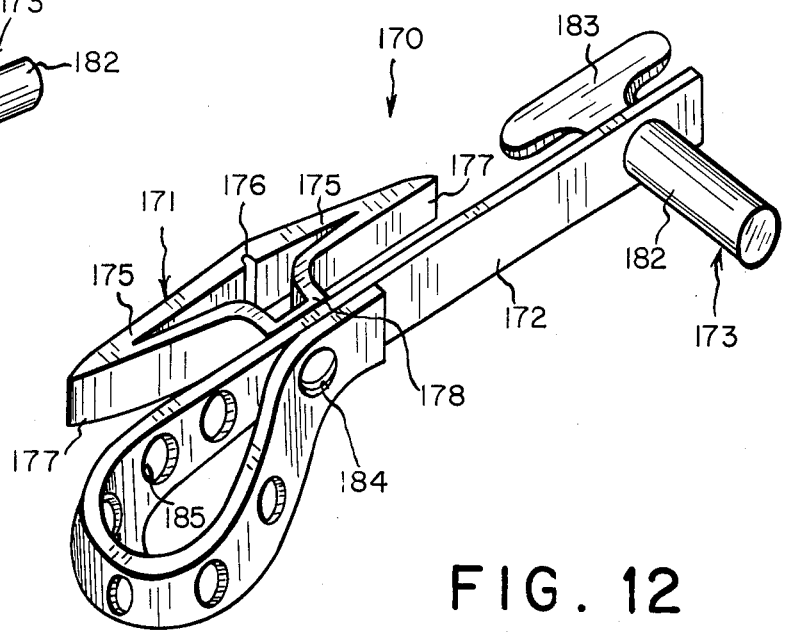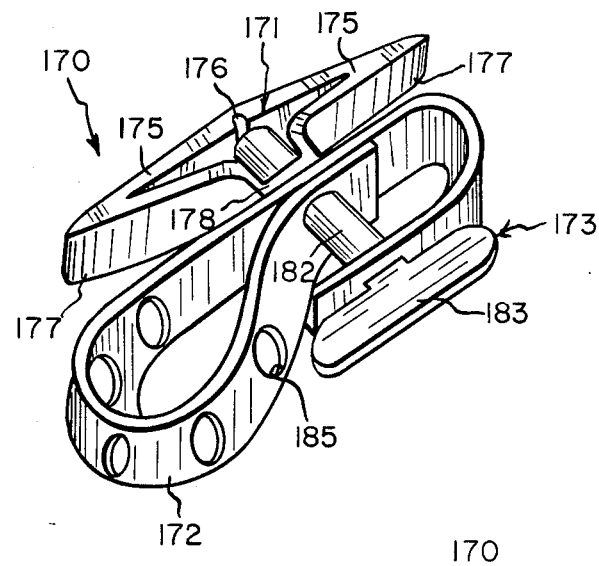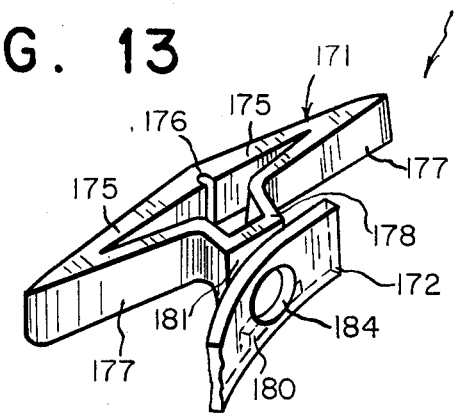

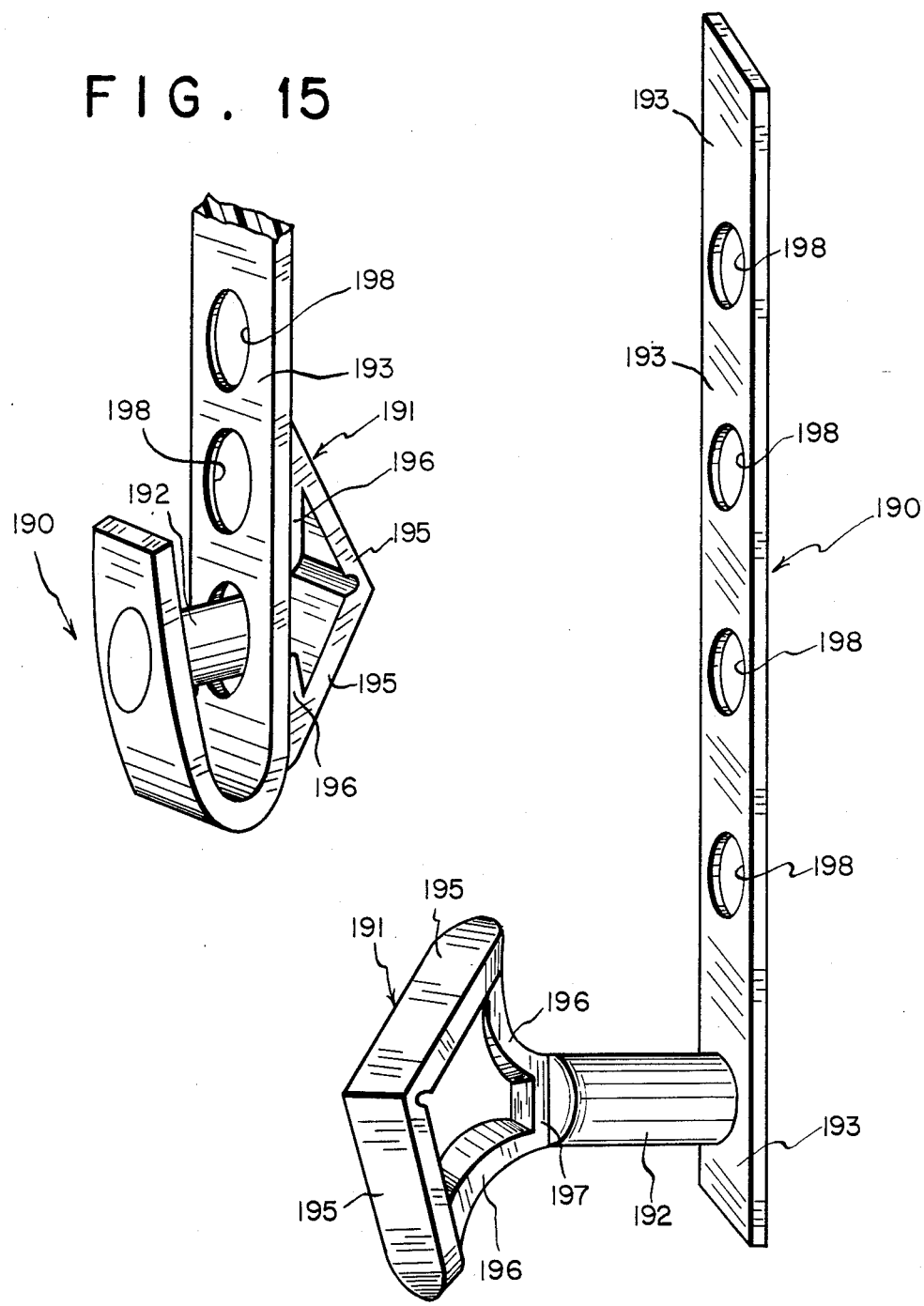

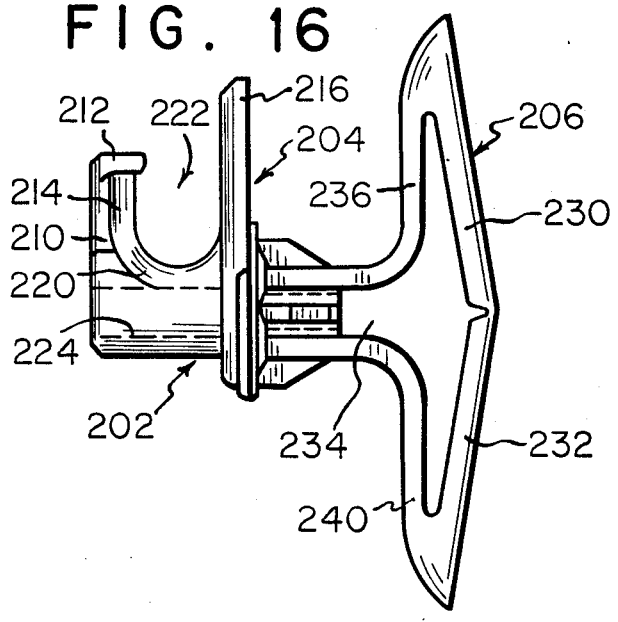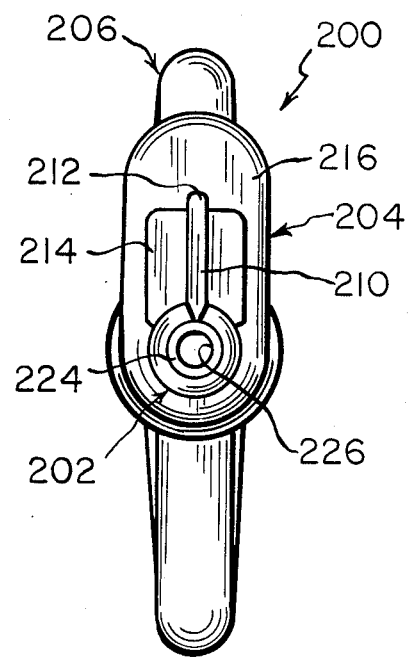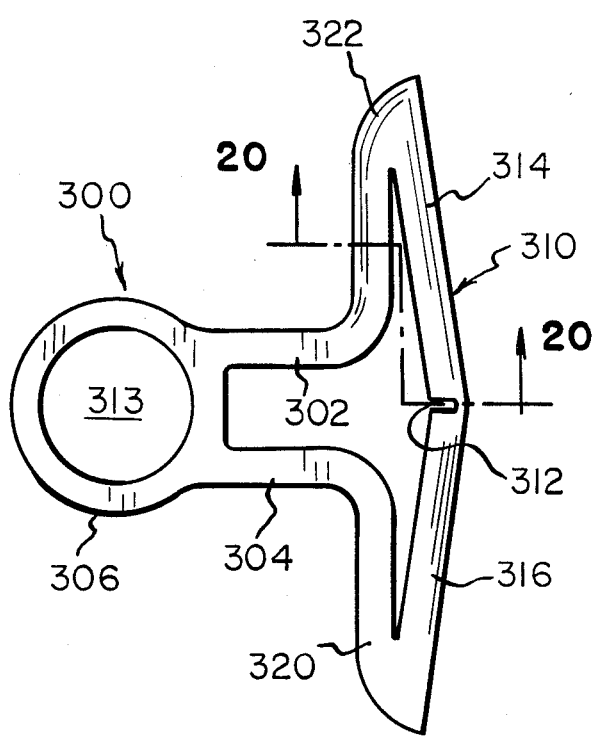

PLASTIC FASTENERS

BACKGROUND OF THE INVENTION

1. Technical Field

This invention generally relates to plastic fasteners, and more particularly to plastic fasteners of the type having expandable locking means for securely maintaining the fasteners in place within an opening.

2. Background Art

Plastic fastening devices having expandable locking means are well known. For example, several fastening devices of this type are described in detail in U.S. Pat. No. 3,651,734. While these devices work very well in a wide range of applications there is room for improvement of them in several important respects.

For example, one type of such fastening device includes a hook portion, and a plurality of these devices are commonly secured to a wall to hold a rack, such as a tool rack or a merchandise display rack, up against that wall. These particular fastening devices are normally locked within a wall opening by means of a screw that is inserted through a screw opening in the device and that engages a toggle lock thereof to hold that lock in an overcenter position. The hook portions of these fasteners are spaced an appreciable distance from the specific portions of the devices that form those screw openings, so that, in use, the screws inserted through the screw openings do not directly support the hook portions of the fasteners or any weight mounted thereon. This problem would also exist when these fastening devices are secured to ceilings, and a similar problem is encountered when other types of fastening devices are attached to floors or decks and used as supports for other structural members.

Also no prior art device of the general type outlined above has been specifically designed for use as a harness that may be employed to gather together a bundle of wires or cables, and in particular, that may be used to hold together wire or cable bundles of various thicknesses. Moreover, prior art fasteners of the general type previously described have not been particularly designed for attachment to ropes or cables, with the toggle locks of the fasteners free to attach the ropes or cables, as desired or needed, to some other device such as a bracket or ring that, in turn, is rigidly secured to a boat deck or dock, or to a ceiling, floor, or wall member.

SUMMARY OF THE INVENTION

One embodiment of this invention is a one piece, integrally molded plastic wire harness comprising a base member, an elongated flexible strap, and expansible locking means. A first end portion of the strap is integrally connected to the base member, a second end portion of the strap is spaced therefrom, and the strap includes multiple teeth for engaging the base member to secure the second end portion of the strap therein. The expansible locking means is also integrally connected to the base member and includes a toggle lock expandable from a collapsed position, in which the toggle lock can be inserted through an opening, into an overcenter expanded position to lock the wire harness within the opening.

The base member includes a pair of notches to receive means for holding or locking the toggle lock in the expanded position. Also, the base member forms a transverse slot to receive the second end of the strap in a close sliding fit and to urge the teeth of the strap into pressure engagement with the base member. This slot has opposite first and second transverse ends, each of which is adapted to receive the second end of the strap.

This wire harness may be easily used to hold a bundle of wires together. At the same time, the fastener is very simple to install and to lock within an opening, such as a wall opening, and in particular, the base member of the fastener does not interfere with locking the fastener within that opening. Also, the wire harness is simple and inexpensive to manufacture, and is made from a plastic by means of an inexpensive injection molding process.

The harness may be used to loop a bundle of wires together in either of two slightly different locations, better enabling the user of the harness to insure that the wire bundle is held at a preferred location. In addition, with a preferred embodiment of this invention, when the strap is inserted into the slot through a first particular end thereof, the strap itself does not interfere with locking the toggle lock in its expanded position. Further, with this preferred arrangement, the same screw that is used to force the toggle lock into its locked position may also be used to lock the strap within the slot formed by the base member of the fastener.

Another aspect of the invention relates to a onepiece integrally molded plastic anchor comprising a base member having a channel portion, an elongated extension connected to the base member and expansible locking means connected to the base member and having a collapsed portion for insertion through an opening as well as an over center expanded position to lock the anchor within the opening. The base member of the anchor also defines an open pathway to receive means for pushing the locking means into the expanded position. Preferably, the elongated extension is a cylindrical or square tube, and it is intended to support a structural element such as a threaded rod or bar.

A further embodiment of the invention relates to an integrally molded two part plastic fastener for holding or supporting at least one item comprising cover means and an anchoring member. The anchoring member comprises a body member having means for attachment to the cover means, expansible locking means connected to one end of the body member and having a collapsed position for insertion through an opening as well as an overcenter expanded position to lock the anchor within the opening, and means for holding or supporting structural items. The holding or supporting means is connected to the end of the body member opposite the expansible locking means and is preferably a hook or ring. A preferred attachment means comprises a threaded area located on the exterior of the body member and a correspondingly threaded area on the interior surface of the cover means.

The cover means is preferably a circular disk having a central aperture which is dimensioned and threaded to correspond to the threading on the exterior of the body member.

Another embodiment is a one piece, integrally molded plastic rack hook comprising a channel portion, a hook portion, and expansible locking means. The hook portion extends upward from and is directly supported by the channel portion. The expansible locking means is also connected to the channel portion of the rack hook. The channel portion has a longitudinal channel opening to receive means to hold the expansible locking means in an expanded position. This longitudinal channel opening is located directly below the hook portion to facilitate using the holding means to directly support the hook portion. Also, this rack hook is very simple and inexpensive to manufacture and is made from a plastic in an injection molding process.

A further type of fastener in accordance with this invention is a one piece, integrally molded plastic rope anchor comprising first and second longitudinally extending legs, an annular ring, and expansible locking means. The first and second legs are spaced apart, and the annular ring is integrally connected to the top ends of those legs. This ring forms a central opening having a transversely extending axis. The expansible locking means is connected to bottom ends of the first and second legs.

In a manner discussed in detail below, this fastener may be used to connect a rope to another object such as a ring on a pier or a dock in a very quick, secure, and reliable manner and, in particular, without requiring that the rope be tied around or to that other object. At the same time, this fastener, too, is very simple and inexpensive to manufacture and is formed by a plastic material in an injection molding process.

Further benefits and advantages of the invention will become apparent from a consideration of the following description given with reference to the accompanying drawing figures which specify and show preferred embodiments of the present invention.

BRIEF DESCRIPTION OF THE DRAWINGS

FIGS. 10 through 13 are perspective views of a third plastic wire harness in accordance with this invention, with portions of the wire harness broken away in FIG. 13.

FIGS. 14 and 15 are perspective views of another plastic wire harness, with portions of this harness broken away in FIG. 15.

FIGS. 16 and 17 are side and front views respectively of a plastic wall hanger in accordance with this invention.

FIGS. 18 and 19 are top and side views respectively of a first plastic rope anchor built in accordance with the present invention.

DETAILED DESCRIPTION OF THE PREFERRED EMBODIMENTS

Figure 1:
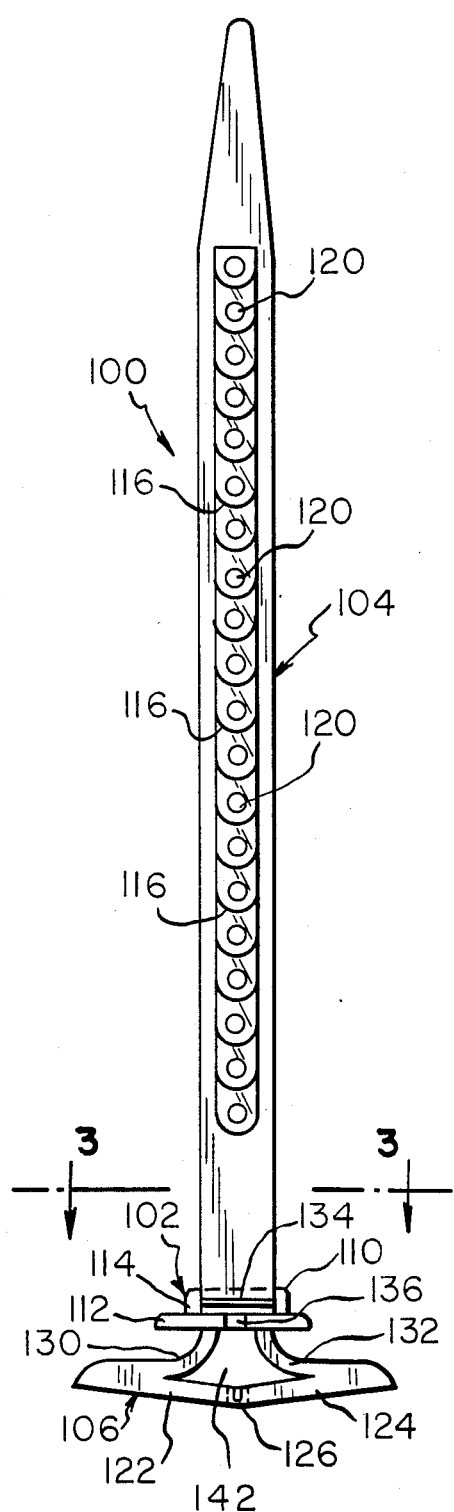
FIGS. 1 and 2 are front and side views respectively of a plastic wire harness in accordance with the present invention.
Figure 2:
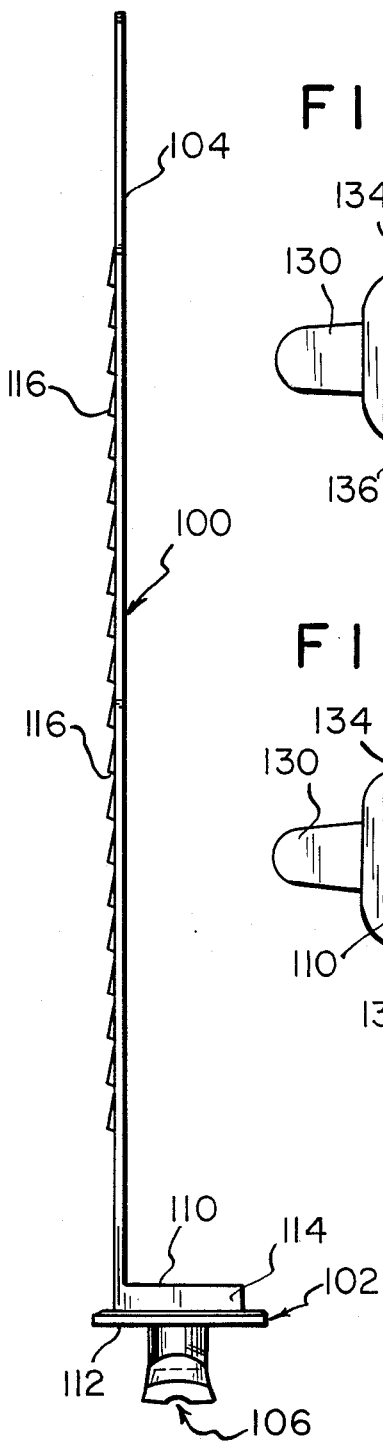

FIGS. 1 through 7 show plastic wire harness 100 generally comprising base member 102, elongated flexible strap 104, and expansible locking means 106. More specifically, base member 102 includes top, bottom and side walls 110, 112 and 114; and flexible strap 104 includes multiple teeth 116 and multiple openings 120. Expansible locking means 106 includes first and second toggle arms 122 and 124, pivotal connecting joint 126, and first and second flexible connecting arms 130 and 132. The various parts of wire harness 100 are formed together from a resilient plastic in an injection molding process. Suitable materials for the construction of wire harness 100 and the other fastener embodiments described below include polypropylene, polyethylene, and nylon, as well as a wide variety of materials which may be chosen with consideration to the fastener configuration, the manner of formation, and the intended use.

Top and bottom walls 110 and 112 of base member 102 are spaced apart, are substantially parallel, and form slot 134 which extends completely through the base member. Side walls 114 extend between and are connected to left and right edges of top and bottom walls 110 and 112, spacing those walls apart. Bottom wall 112 includes front notch 136 that extends rearward from a front edge of the bottom wall, and top wall 110 forms back notch 140 that extends forward from a back edge of the top wall. Portions of notches 136 and 140 overlap slightly, forming a longitudinal opening or pathway through base member 102.

Expansible locking means 106 is integrally connected to base member 102 and is provided to secure wire harness 100 within an opening such as a wall opening. More specifically, flexible connecters 130 and 132 are joined to bottom wall 112 of base member 102 and extend downward and outward therefrom. Lateral ends of toggle arms 122 and 124 are integrally connected to the bottom outward ends of connector arms 130 and 132. Toggle arms 122 and 124 transversely extend across the bottom of harness 100, and centrally located end portions of the toggle members are joined together by integral pivotal connection 126. Pivotal connection 126 has a reduced thickness in comparison to the thickness of toggle arms 122 and 124, and the pivotal connection forms a small centrally located opening that is longitudinally aligned with the overlapping portions of notches 136 and 140. Flexible connecters 130 and 132 are laterally spaced apart to define a central open area 142 into which the pivotal connection 126 and centrally located end portions of toggle arms 122 and 124 move upon collapse of the locking structure.

Flexible strap 104 is integrally connected to base member 102 and longitudinally extends upward therefrom. More particularly, strap 104 has a substantially rectangular shape, a first longitudinal end of the strap is integrally connected to a front edge of wall 110 of base member 102, and a second longitudinal end of the strap is spaced from the base member. The front surface of strap 104 forms teeth 116. Teeth 116 extend transversely across strap 104, and are longitudinally distributed along a major portion thereof. Upper sides of teeth 116 have a relatively gradual slope, and lower sides of the teeth have a comparatively sharp slope. These lower sides of teeth 116 have arcuate shapes. Openings 120 are also longitudinally distributed along a major portion of strap 104, and preferably each tooth 116 forms one opening 120 centrally located between the left and right edges of strap 104.

In use, second end of strap 104 is inserted through slot 134, and this end of the strap tapers inward to facilitate inserting a strap into the slot. The width of strap 104 is slightly less than the width of slot 134; and the depth of the strap—that is its left to right dimension as viewed in FIG. 2—at the peaks of teeth 116 is slightly greater than the height of slot 134. The length of strap 104 may vary, of course, depending on the particular application for wire harness 100.

To use wire harness 100, a bundle of wires is gathered together, and strap 104 is looped around that bundle and inserted through slot 134, forming a closed loop 144. Preferably, of course, strap 104 is pulled tightly through slot 134, holding the wire bundle tightly together. Once the second end of strap 104 is inserted through slot 134, teeth 116 inhibit the strap from being pulled back outward through the slot.

Figure 4:
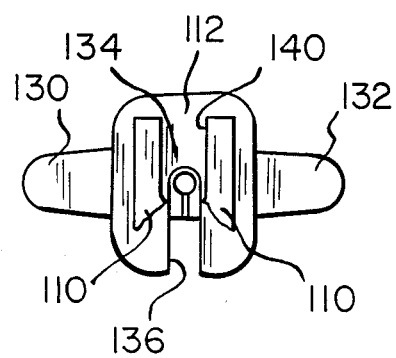
Figure 5:
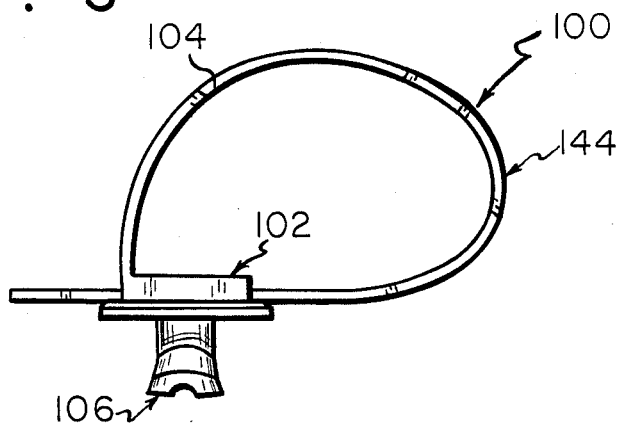
FIGS. 5 and 6 are side views of the harness illustrated in FIGS. 1 through 4, with FIG. 5 showing the elongated strap of the harness after being inserted in a first direction through the slot thereof, and FIG. 6 showing the elongated strap after being inserted in a second direction through the slot.

With particular reference to FIGS. 4 and 5, when strap 104 is inserted through slot 134 from the back end thereof, top wall 110 of base member 102 forces strap teeth 116 into pressure engagement with bottom wall 112 of the base member. Teeth 116 compress slightly as they move over the back portions of bottom wall 112, and then the teeth expand to their original shape as they move past the back edge of front notch 136 so that the teeth project slightly below the very top of that edge. If strap 104 is pulled outward, to the right as viewed in FIG. 5, the acurately sloped, sharp sides of teeth 116 contact the back edge of notch 136, preventing, or at least inhibiting, further outward movement of the strap.

Figure 3:
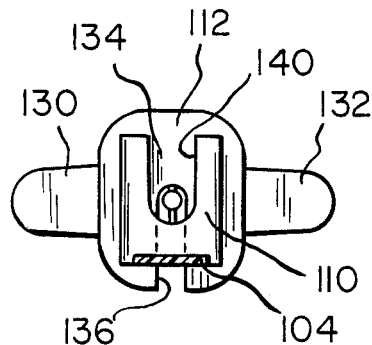
FIGS. 3 and 4 are top views taken along line III—III of FIG. 1, with portions of the wire harness broken away in FIG. 4.
Figure 6:
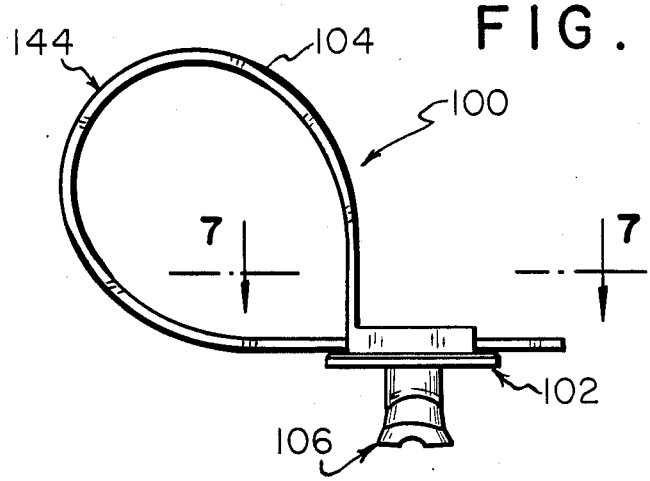
Figure 7:
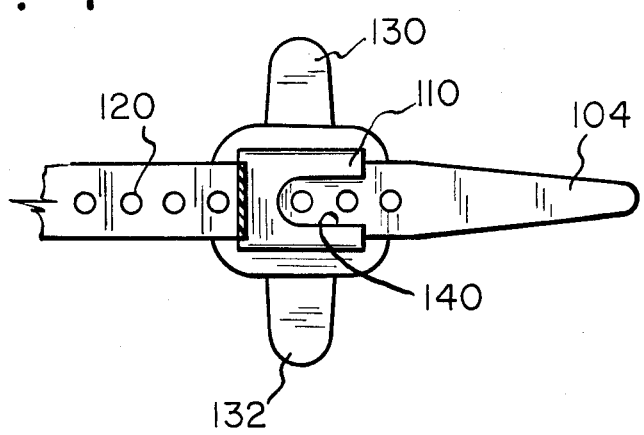
FIG. 7 is a top view taken along line VII—VII of FIG. 6.

Analogously, with particular reference now to FIGS. 3 and 6, when strap 104 is inserted through slot 134 from the front end thereof, bottom wall 112 of base member 102 forces strap teeth 116 into pressure engagement with top wall 110 of the base member. Teeth 116 compress slightly as they move past the front portion of top wall 110, and then the teeth expand to their original shape as they move past the front edge of back notch 140 so that they then project slightly above the very bottom of that front edge. If strap 104 is pulled outward, to the left as viewed in FIG. 6, the arcuately shaped, sharply sloped sides of teeth 116 engage the front edge of notch 140, preventing, or at least inhibiting, further outward movement of the strap.

To lock harness 100 within an opening, toggle arms 122 and 124 are pushed into their collapsed position, between connecting arms 130 and 132, and then the toggle arms are inserted through the opening. Once inserted through the opening, connecting members 130 and 132 flex outward due to their inherent resiliency, tending to pull toggle members 122 and 124 into their expanded over-center position. If connecting members 130 and 132 do not pull toggle members 122 and 124 completely into their overcenter position, the toggle members may be pushed into that position—and, in any case, the toggle members may be locked in the expanded position—by inserting a screw through aligned portions of notches 136 and 140 and opening 134 and using that screw to push the toggle members outward.

As is apparent from FIGS. 5 and 6, loop 144 may be formed in two slightly different locations. This gives the user of harness 100 increased flexibility as to where loop 144 may be located. Moreover, formation of loop 144 does not interfere with operation of expansible locking means 106, and thus harness 100 may be secured within an opening either prior to or after the loop is formed.

When strap 104 is inserted through slot 134 from the front end thereof, the strap does not extend over top wall 110 of base member 102. In this case, strap 104 may be securely locked in place by aligning one of the openings 120 of the strap with aligned portions of front and back notches 136 and 140 and with central opening 134, and then inserting means such as a screw, through this opening of the strap, the aligned portions of notches 136 and 140, and the central opening 134. This same screw may be used to lock toggle arms 122 and 124 in their overcenter position. Of course, strap 104 may be unlocked from this position simply by removing the above-mentioned screw.

Figure 8:
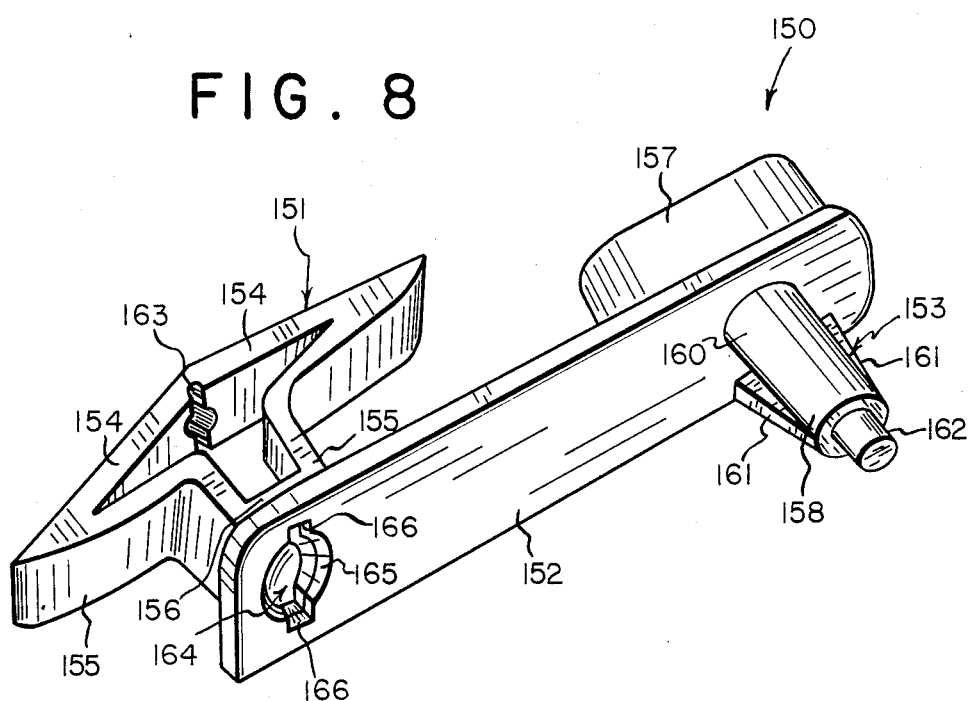
FIGS. 8 and 9 are front perspective views of an alternate plastic wire harness.
Figure 9:
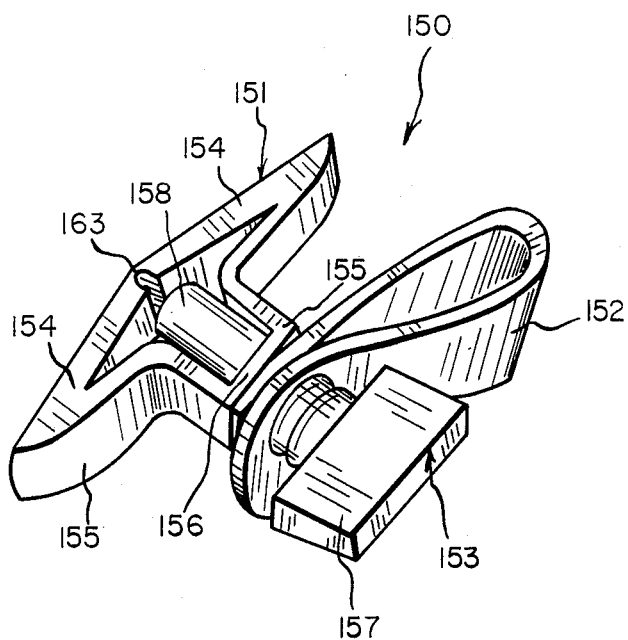
Figure 19:
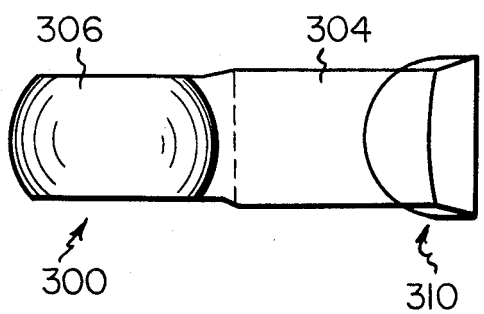
Figure 20:
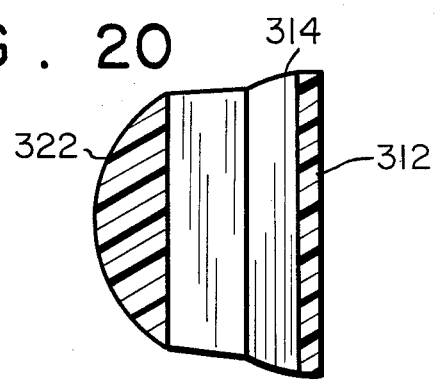
FIG. 20 is a sectional view taken along line XX—XX of FIG. 18.

FIGS. 8 and 9 show an alternate wire harness 150 comprising locking means 151, flexible strap 152, and key 153. More specifically, locking means 151 includes a pair of toggle arms 154, connecting arms 155, and shoulder 156; and key 153 includes handle or grip 157 and body 158. Key body 158, in turn, includes cylindrical main portion 160, locking flanges 161, and stablizing post 162. Connecting arms 155 include generally parallel front portions, and side portions that extend outward from those front portions. Lateral ends of toggle arms 154 are integrally connected to ends of connecting arms 155, the toggle arms transversely extend across the bottom of harness 150, and centrally located ends portions of the toggle arms are joined together by pivotal connection 163. Shoulder 156 is integrally connected to and transversely extends across the front of connecting arms 155.

A first end of flexible strap 152 is integrally connected to locking means 151, specifically shoulder 156, and transversely extends thereacross. Key body 158 extends forward from a front face of strap 152, adjacent or near a second end thereof, and key grip 157 extends rearward from a back face of the strap, directly behind the key body. Locking flanges 161 radially extend outward from cylindrical portion 160 of key body 158, axially along a major part of the length of that cylindrical portion. Stablizing post 162 extends forward from a front face of key body 158.

The first end of flexible strap 152 forms a portion of keyway 164 which is provided to receive key body 158. Preferably this portion of keyway 164 is located directly forward of shoulder 156, which forms a second portion of the keyway, allowing key 153, specifically key body 158, to be inserted through both strap 152 and shoulder 156. Keyway 164 includes a main central opening 165 for receiving main portion 160 of key body 158, and a pair of notches 166 extending outward from the main central opening of the keyway for receiving flanges 161 of the key body. It should be noted that, alternately, the first end of strap 152 may form a keyway that is not directly forward of shoulder 156.

With the above-described arrangement, flexible strap 152 and key 153 are movable between an open position (shown in FIG. 8), wherein the key is spaced from keyway 164, and a closed position (shown in FIG. 9), wherein the key extends within the keyway and connects the first and second ends of the strap together to form a closed loop.

In use, toggle arms 154 are forced into a collapsed position, inserted through an opening such as a wall opening, and then allowed to return to their expanded position, securing wire harness 150 within that opening. A bundle of wires is gathered together, strap 152 is looped around that bundle, and key 153 is inserted through keyway 164.

As will be clear from a review of FIG. 8, flanges 161 and notches 166 are not aligned. That is, flanges 161 slant outwardly from main portion 160 of key body 158 in a first plane, and notches 165 extend outward from central opening 165 of key way 164 in a second plane, and these two planes are oriented relative to each other so that the key body must be rotated about the axis of main cylindrical portion thereof in order to insert flanges 161 through notches 165. Once inserted through keyway 164, key body 158 flexes back toward its original angular orientation relative to notches 165 so that flanges 161 or at least portions thereof, project directly reared of solid surfaces adjacent keyway 164. This inhibits inadvertent movement of key body 158 back outward through keyway 164. Preferably, flanges 161 slant rearwardly outward, from the front of the key body 158 toward the back thereof, to facilitate moving those flanges through notches 166. Also, the length of key body 158 and stabilizing post 162 are chosen so that, when the key body is in the closed position, the stabilizing post engages central portions of toggle arms 154, securely holding those arms in their expanded, over-center position.

As will be understood by those skilled in the art, it is not necessary that key body 158 be provided with a pair of locking flanges 161 in order to lock that body in keyway 164. For example, key body 158 may be provided with a single flange 161 to lock that key body within keyway 164. At the same time, it should be observed that key body 158 may hold the toggle arms 154 in their over-center position by engaging the toggle assembly—that is, the assembly comprising the toggle arms and pivotal connection 163 therebetween—in an area or location other than directly in between the toggle arms.

FIGS. 10 through 13 show a third wire harness 170 also in accordance with this invention. Harness 170 comprises locking means 171, flexible strap 172, and key 173. Locking means 171 includes toggle arms 175, pivotal connection 176, connecting arms 177, shoulder 178 and connecting flange 180 (shown in broken lines in FIG. 13). Toggle arms 175 arms and connecting arms 177 operate substantially identically to toggle arms 154 and connecting arms 155 described above and so will not be described here in detail.

A first end of flexible strap 172 is integrally connected to and transversely extends from locking means 171. With this embodiment of wire harness 170, this first end of strap 172 and locking means 171 also form a transversely extending groove 181 for receiving intermediate portions of the strap. More specifically, shoulder 178 and strap 172 are spaced apart and connected together by connecting flange 180, which extends between lower portions of shoulder 178 and strap 172.

Key 173 is integrally connected to strap 172 adjacent or near a second end thereof. With wire harness 170, key body 182 extends rearward from a back face of strap 172, and key grip 183 extends forward from a front face of the flexible strap. The first end of flexible strap 172 forms a portion of keyway 184 for reciving key body 182. Here too, preferably this portion of keyway 184 is located directly forward of shoulder 178, which forms a second portion of keyway 184, allowing key 173, specifically key body 182, to be inserted through both strap 172 and shoulder 178.

As will be appreciated by those skilled in the art, key body 182 may be provided with flanges analogous to locking flanges 161 of harness 150, and keyway 184 may be provided with notches analogous to notches 166 of keyway 164, which would cooperate together, just as flanges 161 and notches 166 do, to lock key body 182 within keyway 184. Also, keyway 184 may be formed by a portion of the first end of flexible strap 172 that is not directly forward of shoulder 178. Flexible strap 172 forms a multitude of openings 185 between keyway 184 and key 173 and which have shapes substantially identical to the shape of the keyway.

With wire harness 170, strap 172 and key 173 also are supported for movement between an open position (shown in FIG. 10), wherein the key is spaced from keyway 184, and a closed position (shown in FIG. 12), wherein the key extends within the keyway and connects the first and second ends of the flexible strap together to form a closed loop. With this embodiment, when key 173 and strap 172 are in the closed position, an intermediate portion of the flexible strap extends through groove 181, and the strap and the key actually form a pair of loops, either or both of which may be used to hold a bundle of wires or another object.

In use, toggle arms 175 are forced into a collapsed position and then inserted through an opening. A bundle of wires is gathered together, strap 172 is looped around that bundle, and an intermediate portion of the strap is inserted into groove 181. This may be done, for instance, by simply slipping an intermediate portion of strap 172 downward through the top of groove 181. Strap 172 is positioned so that one of the openings 185 thereof is aligned with keyway 184, and then key body 182 is inserted through the keyway and the aligned strap opening. The length of key body 182 is chosen so that, when the key body is fully inserted through keyway 184, the key engages and securely holds toggle arms 175 in their expanded or over center position.

FIGS. 14 and 15 illustrate another wire harness 190 comprising locking means 191, connecting post 192, and flexible strap 191. Like locking means 151 and 171 described above, locking means 191 comprises a pair of toggle arms 195, a pair of connecting arms 196, and shoulder 197. Locking means 191 operates substantially identically to locking means 151 and 171 described above, and it is hence felt unnecessary to describe the operation of locking means 191 here in detail.

A back end of post 192 is integrally formed with shoulder 197 and axially extends forward therefrom. A first end of strap 193 is integrally formed with a front end of post 192 and transversely extends therefrom. Strap 193 defines at least one and preferably a plurality of openings 198 for receiving locking means 191; and the flexible strap may be as long as desired, depending on the particular application for wire harness 190. With this arrangement, strap 193 supports connecting post 192 and locking means 191 for movement between an open position (shown in FIG. 14), wherein the locking means is located on a first side of and is spaced from the flexible strap, and a closed position (shown in FIG. 15), wherein the locking means extends within a strap opening 198 and engages a second side of the flexible strap to connect the strap and the connecting post together to form a closed loop.

In use, a bundle of wires is gathered together, locking means 191 is looped around that bundle, and then toggle arms 195 are collapsed and inserted through one of the strap openings 198. Toggle arms 195 are then inserted through another opening such as a wall opening and allowed to expand to their over-center position to secure wire harness 190 in that latter opening.

With regard, now, to FIGS. 16 and 17, plastic wall hanger 200 generally comprises channel portion 202, hook portion 204, and expansible locking means 206. Preferably, hanger 200 also includes front reinforcing flange 210 and flexible pin 212; and hook portion 204 includes front and back legs 214 and 216 and base member 220, which together form recess 222.

Expansible locking means 206 is integrally connected to channel portion 202 and is provided to secure wall hanger 200 within an opening such as a wall opening. Expansible locking means 206 is substantially identical to expansible locking means 106 described above and, thus, will not be described in detail here.

Channel portion 202 of wall hanger 200 has a generally cylindrical shape, and the channel portion has a hollow, longitudinal opening 224 aligned with central opening 226 of expansible locking means 206. Opening 224 is provided to receive means to lock the expansible locking means in an overcenter position.

Hook portion 204 extends upwards from and is directly supported by channel portion 202—that is, the hook portion either is contiguous to or is itself formed in part by the channel portion of wall hanger 200. More specifically, front and back legs 214 and 216 of hook portion 204 are parallel to and longitudinally spaced from each other and extend upward substantially perpendicular to the longitudinal axis of channel portion 202. Base 220 of hook portion 204 is upwardly concave and curves between front and back legs 214 and 216 of the hook portion. With the embodiment of the invention shown in FIGS. 16 and 17, base 220 is formed, in part, by an upper section of channel portion 202. Locating hook portion 204 either contiguous to or forming it, in part, by channel portion 202 insures that any screw or rod inserted into opening 222 of the channel member in a close fit with the inside surfaces thereof directly supports hook portion 204, and any loads placed thereon.

Front flange 210 extends forward from front leg 214 of hook portion 204 and upward from channel portion 202 to reinforce that leg 214. More specifically, flange 210 extends forward from the transverse center of leg 214 and upward from the top, transverse center of channel portion 202, and the front edge of flange 212 is substantially coplanar with the front edge of the channel portion 202. The upper portion of flange 210 terminates in locking pin 212, which longitudinally projects rearward slightly over recess 222 to facilitate retaining an object therein. Front leg 214 and front flange 210 are slightly flexible, though, and in particular can be bent or pushed forward slightly. This allows an object having a width approximately equal to the longitudinal dimension of recess 222 to be moved into and out of that recess despite the presence of locking pin 212.

To use wall hanger 200, toggle arms 230 and 232 are pushed into the area 234 between connecting arms 236 and 240, and then the toggle arms are inserted through a hole or opening. Once inserted through that opening, connecting arms 236 and 240 flex outward, pulling toggle arms 230 and 232 toward their expanded, overcenter position. Means, such as a screw, having an outside diameter substantially equal to the inside diameter of longitudinal opening 224 is inserted through that opening to push toggle arms 230 and 232 into then overcenter position and to keep both toggle arms in such therefor position.

Once wall hanger 200 is secured in place, an object such as a rod is mounted on the wall hanger by simply placing it in recess 222. Typically, hanger 200 will be used with one or more additional, identical wall hangers, with all the hangers secured to a wall at the same height and horizontally slightly spaced apart. A rod is moved into the recesses of these horizontally aligned wall hangers, supporting the rod at a predetermined height. Retaining pin 212 inhibits inadvertant upward movement of the rod out of recess 222.

Rope anchor 300 is illustrated in FIGS. 18, 19, 20 and 21; and generally the rope anchor includes first and second legs 302 and 304, annular ring 306 and expansible locking means 310. Legs 302 and 304 are spaced apart, and ring 306 is integrally connected to top longitudinal ends of those legs. Ring 306 forms central, circular opening 312, and the axis of this opening extends transversely across rope anchor 300, perpendicular to the longitudinal axis of legs 302 and 304.

Expansible locking means 310 is integrally connected to bottom longitudinal ends of legs 302 and 304 and, similar to expansible locking means 106 and 206 described above, is provided to secure anchor 300 within an opening. Locking means 310 is slightly different from the expansible locking means 106 and 206 previously discussed in that the pivotal connection 312 between centrally located ends of toggle arms 314 and 316 transversely extends continuously between those ends of the toggle arms—that is, this pivotal connection does not form any central opening.

Figure 21:
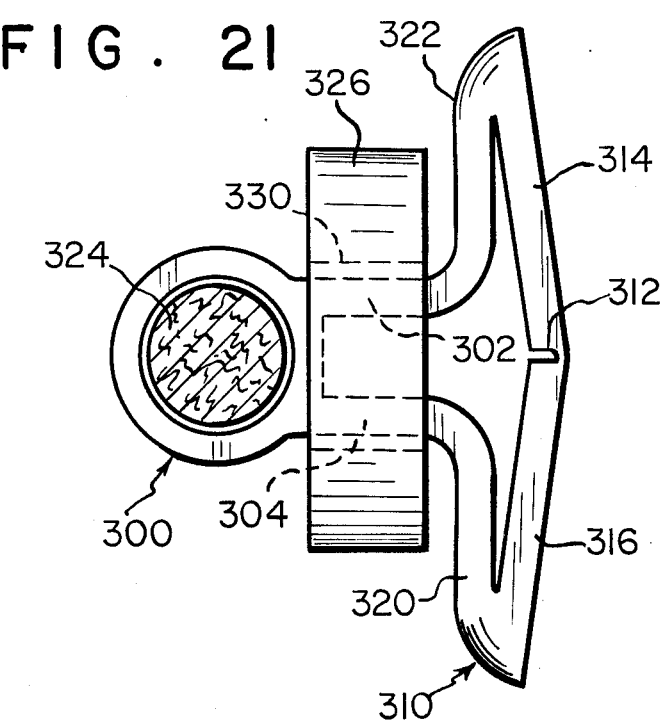
FIG. 21 is a top view similar to FIG. 18 and showing the rope anchor connected to another object.
Figure 22:
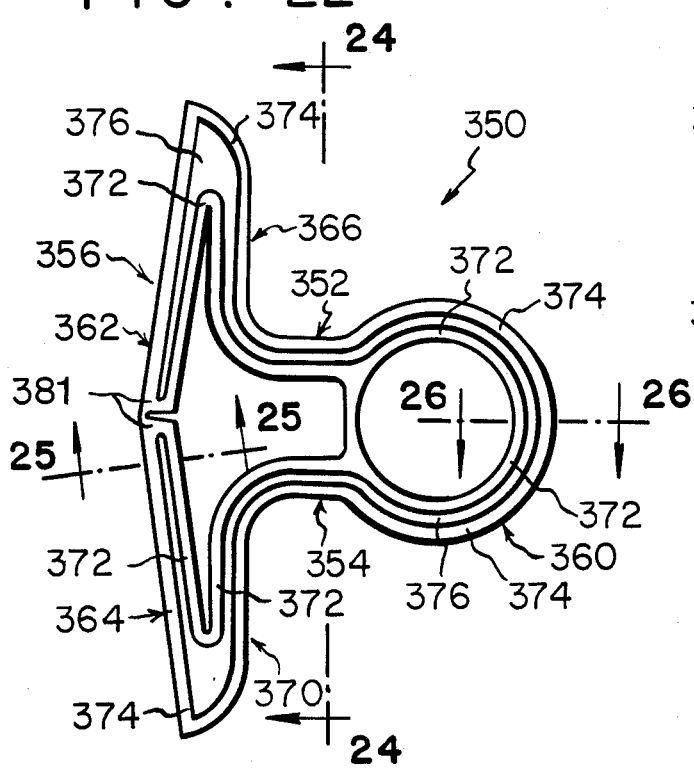
FIGS. 22 and 23 are top and side views of a second plastic rope anchor also in accordance with this invention.
Figure 24:
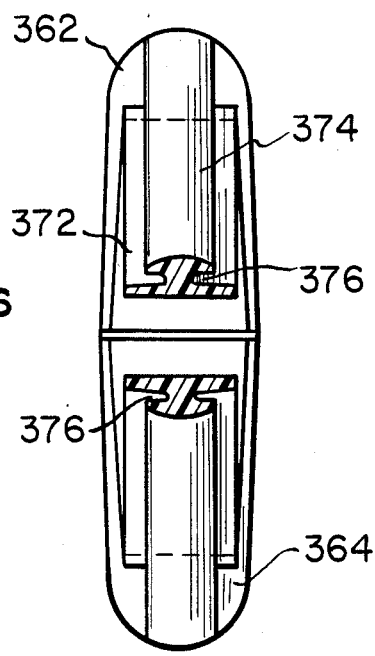
FIGS. 24, 25 and 26 are sectional views taken along lines XXIV—XXIV, XXV—XXV and XXVI—XXVI respectively of FIG. 22.

Anchor 300 is primarily intended for use with a rope, and even more specifically, to connect a rope to another ring, such as a ring which may be secured to a deck of a boat or to a pier. To do this, a first end of the rope is slipped through opening 312 of ring 306; and a knot is formed in the rope, between that first end of the rope and ring 306, preventing anchor 300 from falling off that end of the rope. With reference to FIG. 21, which shows rope 324 inserted through ring 306, rope 330 may then be connected to some other object 326 having an opening 340 simply by collapsing connecting arms 320 and 322 and toggle arms 314 and 316 and inserting those arms through opening 330. Once arms 314, 316, 320 and 322 are inserted through opening 330, connecting arms 320 and 322 flex outward, pulling toggle arms 314 and 316 into their overcenter position.

Because both sides of anchor 300 are accessible, if connecting arms 320 and 322 do not pull toggle arms 314 and 316 completely into the overcenter position, the toggle arms can be manually pulled into that position. To remove anchor 300 from the ring 326, toggle arms 314 and 316 and connecting arms 320 and 322 are manually collapsed and then withdrawn through opening 330. Because toggle arms 314 and 316 of anchor 300 are accessible during the use of the anchor, it is not necessary to provide the anchor with a longitudinal opening which would give access to the toggle arms from the front of the anchor, nor is it necessary to provide pivotal connection 330 between toggle arms 320 and 322 with a central opening, analogous to the central openings 134 and 226 discussed above.

It should be noted that anchor 300 may be used in other ways. For example, toggle arms 314 and 316 may be inserted through the weave of a rope, either completely through or into the interior thereof, to connect the anchor to the rope, with ring 306 then used to connect the rope to some other object such as a hook or another rope. Also, of course, it is not necessary that toggle arms 314 and 316 be accessible after being inserted through an opening. This is so because normally connecting arms 320 and 322 will pull toggle arms 314 and 316 sufficiently outward toward their expanded position to hold anchor 300 securely in place even if the toggle arms are not pulled over center.

FIGS. 22 through 26 illustrate a second rope anchor 350 which comprises first and second legs 352 and 354, expansible locking means 356, and annular ring 360, with the expansible locking means, in turn, including first and second toggle arms 362 and 364 and first and second connecting arms 366 and 370. Anchor 350, though, is formed from inside strip 372 and outside strip 374 with connecting portion 376 extending between these strips. Inside and outside strips 372 and 374 are substantially parallel to and slightly spaced from each other throughout substantially their entire length. Inside strip 372 traverses the inside perimeter of anchor 350, and in particular forms the inside surfaces of ring 360, legs 352 and 354, toggle arms 362 and 364, and connecting arms 366 and 370. Outside strip 374 traverses the outside perimeter of anchor 300 and forms the outside surfaces of ring 360, legs 352 and 254, toggle arms 362 and 364, and connecting arms 366 and 370.

Figure 23:
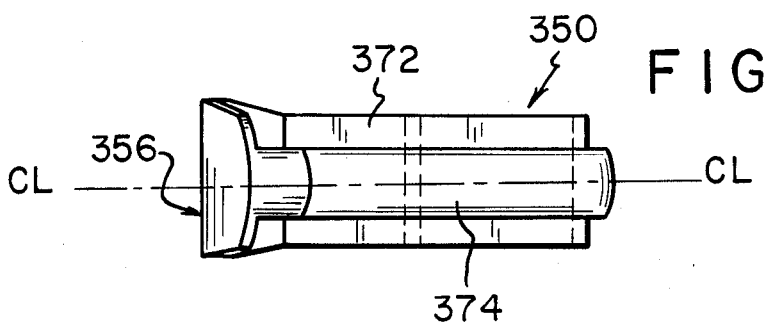
Figure 25:
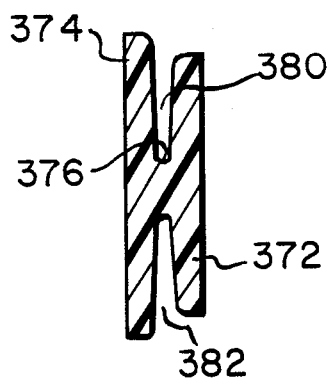
Figure 26:
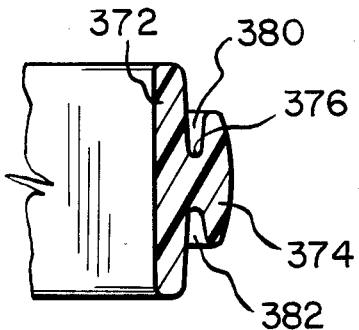
Figure 27:
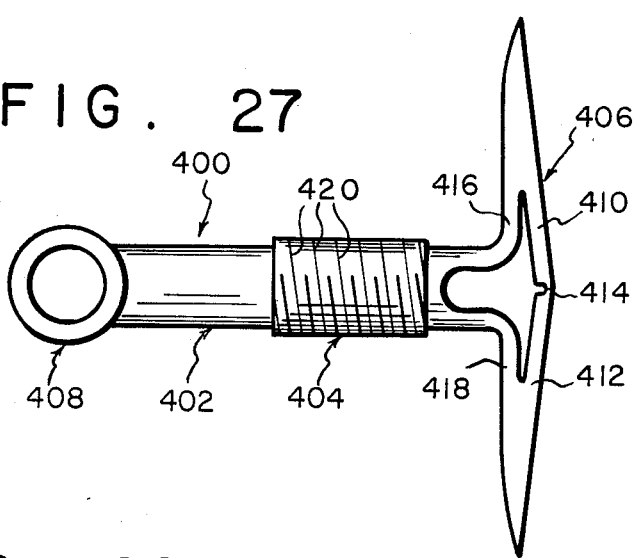
FIG. 27 is a top view of a plastic anchor in accordance with the invention.
Figure 28:
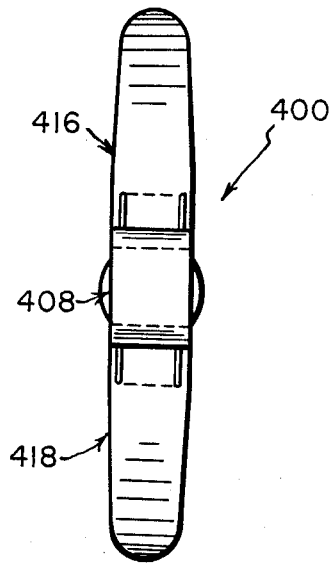
FIGS. 28 and 29 are side views of the plastic anchor of FIG. 27.
Figure 29:
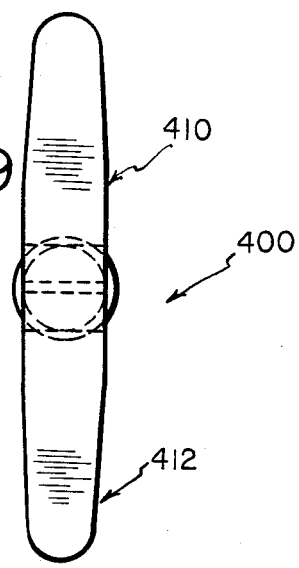
Figure 30:
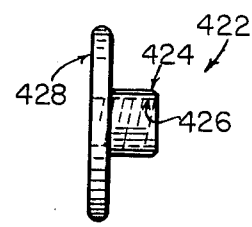
FIGS. 30 and 31 are side and front views, respectively, of a cover plate which can be used in conjunction with the plastic anchor of FIG. 27.
Figure 31:
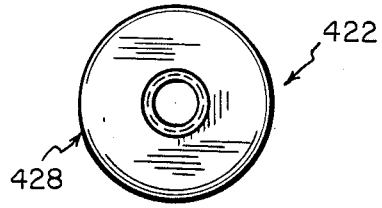
Figure 32:
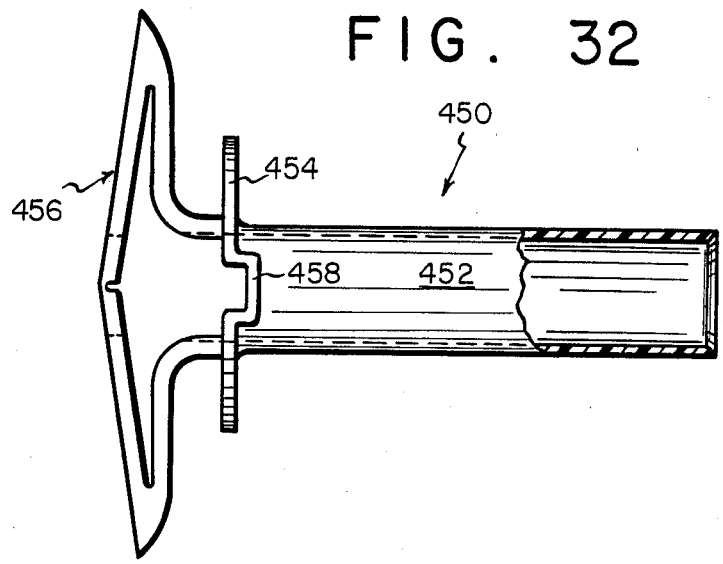
FIG. 32 is a top view of another anchor of the present invention.
Figure 33:
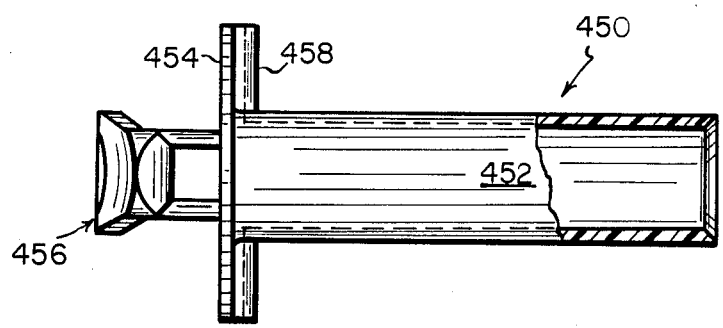
FIG. 33 is a front view of the plastic anchor of FIG. 32.
Figure 34:
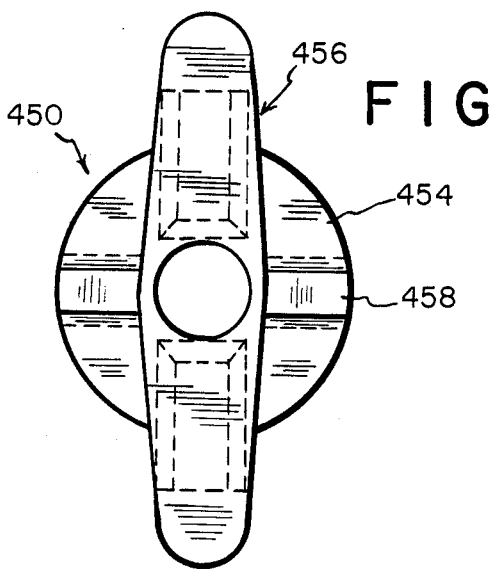
FIGS. 34 and 35 are side views of the anchor of FIG. 32.
Figure 35:
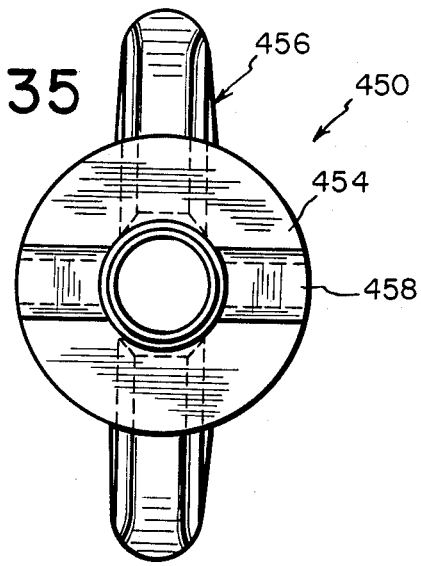

Inside strip 372 has a substantially uniform width—that is, the top to bottom dimension as viewed in FIG. 23—while outside strip 370 has a non-uniform width. In particular, the portions of toggle arms 362 and 364 that are formed by outside strip 374 have a uniform width that is greater than the width of inside strip 372; and the portions of annular ring 360, legs 352 and 354, and connecting arms 366 and 370 that are formed by outside strip 372 have a substantially uniform width, which is less than the width of the inside strip. Both strips 372 and 374, however, are symmetrical about a central plane extending through anchor 300 from the front to the back thereof—that is the plane identified by the line CL—CL in FIG. 23. Strips 372 and 374 are slightly spaced apart throughout their entire length, except at the adjacent central ends of toggle arms 362 and 364, where lips 381 of outside strip 374 extend inward into contact with adjacent portions of inside strip 372.

Connecting portion 376 laterally extends between and integrally connects together inside and outside strips 372 and 374 along their entire lengths. Connecting portion 376 is substantially centrally located between front and back sides of inside and outside strips 372 and 374. Portion 376 increases the stiffness and strength of strips 372 and 374. At the same time, strips 372 and 374 and portion 376 cooperate to define front peripheral recess 380 and back peripheral recess 382. Recesses 380 and 382 provide space between upper adjacent and lower adjacent portions of strips 372 and 374, allowing those portions of anchor 350 to flex slightly during use of the anchor. Rope anchor 350 is intended for high strength application, and with this embodiment, connecting arms 366 and 370 are sufficiently stiff to virtually insure that the connecting arms force toggle arms 362 and 364 into an overcenter position after the toggle arms have been passed through an opening.

FIGS. 27 through 31 show plastic ceiling anchor 400 generally comprising base member 402 having a threaded exterior portion 404, expansible locking means 406 and attachment ring 408. The base member 402 is preferably a hollow tube which is integrally molded to ring 408, exterior portion 404, and expansible locking means 406. Expansible locking means 406 includes first and second toggle arms 410 and 412, pivotal connecting joint 414, and first and second flexible connecting arms 416 and 418.

The various pieces are formed by an injection molding process utilizing a suitable flexible plastic material as described above with regard to the other fasteners. Similarly, expansible locking means 406 is substantially identical to expansible locking means 106 of FIGS. 1–7 as described above. The expansible locking means provides secure attachment to a wall or ceiling opening so that ring 408 can support the weight of an object to be attached or supported.

Exterior portion 404 is provided with threads 420 on its outer diameter so as to allow for connection of cover plate 422. This cover plate 422 has a cylindrical portion 424 which has threads 426 on its internal diameter. Cover plate 422 is dimensioned and configured so that the internal diameter and threads 426 of tubular portion 424 correspond precisely to the outer diameter and threads 420 of exterior portion 404. This allows the cover plate 422 to be firmly attached to anchor 400 while providing two advantages:

(1) disk 428 covers the hole in the wall or ceiling through which the expansible locking means 406 of the anchor 400 are inserted to provide a more decorative appearance, and (2) disk 428 can be tightened by rotation over the threads 420 of the exterior portion to more firmly secure anchor 400 to the wall or ceiling.

FIGS. 32 through 35 show a plastic deck anchor 450 generally comprising base member 452 having flange 454 with reinforcing channel 458 and expansible locking means 456. The base member 452 is preferably a hollow tube which is integrally molded to flange 454, channel 458, and expansible locking means 456 by an injection molding process, using suitable plastic material as previously described. The expansible locking means 456 is substantially identical to expansible locking means 106 of FIG. 1 to 7.

In this arrangement, the expansible locking means 456 are collapsed and inserted into a hole in a steel plate or decking. Then, a metal stud, J-bolt, or eye bolt, or similar mechanical anchoring member (not shown) is inserted into tube 452 so as to fit snugly within the tube with one end of the member, suitably bearing external screw threads, projecting out from the expansible locking means 456, and the other end having a head, or J or eye, projecting out from the end of the tube 452. As a result, the member will be held in an upright position and will cause the expansible locking means 456 to expand to its locked position, if not already in that position. Then, concrete or cement (or even adhesive) can be poured around the tube portion 452 of the anchor 450 to mechanically interlock with the exposed head or J or eye of the anchoring member and secure the anchor in its vertical position. The exposed screw threaded opposite end of the anchoring member below the concrete filled decking may then be used to support pipe fittings or hangers, suspended ceiling hangers, and similar structural parts. In addition to providing additional mechanical strength to the plastic anchor, channel 458 allows some of the poured cement or concrete to flow between it and the decking for additional strength and stability.

While it is apparent that the invention herein disclosed fulfills the objects previously described, it will be appreciated that numerous modifications and embodiments of this invention will be evident or may be devised by those skilled in the art, and it is intended that the appended claims cover all such modifications, embodiments, and all equivalents thereof, as fall within the true spirit and scope of the present invention.

Having thus described our invention, what we claim as new and desire to secure by Letters Patent is:

1. A one piece integrally molded plastic anchor comprising:
   (a) a base member having a channel portion;
   (b) elongated extension means integrally connected to a first side of said base member for supporting and attaching an object thereto; and
   (c) expansible locking means integrally connected to a second side of said base member and having a collapsed position for insertion through an opening defined by a structural member and an overcenter expanded position to lock said anchor within said opening, with said locking means comprising:
      (i) a pair of connecting arms integrally connected to said second side of said base member and extending outwardly away therefrom;
      (ii) a pair of toggle arms connected to lateral ends of said connecting arms and extending inwardly therefrom; and
      (iii) means connecting the inward ends of said toggle arms together for pivotal movement between said collapsed and expanded positions and wherein, in said expanded position, said toggle arms are in said overcenter position with said fastener being thereby securely locked to said structural member;
   said base member also defining an open pathway to receive means for pushing said locking means into said expanded position.

2. The anchor according to claim 1 wherein said elongated extension means is a tube.

3. The anchor according to claim 2 wherein said tube has a cylindrical configuration.

4. The anchor according to claim 3 wherein said cylindrically configured tube supports a structural element.

5. The anchor according to claim 4 wherein said structural element is a threaded rod or bar.

6. An integrally molded one piece plastic fastener for holding or supporting at least one elongated item comprising:
   an elongated body member;
   expansible locking means integrally connected to a first side of said elongated body member and having a collapsed position for insertion through an opening in a structural member and an overcenter expanded position to lock said fastener within said opening, with a second side of said elongated body member extending from said opening in said structural member, with said locking means comprising:
      (a) a pair of connecting arms integrally connected to said first side of said body member and extending outwardly away therefrom;
      (b) a pair of toggle arms connected to lateral ends of said connecting arms and extending inwardly therefrom; and
      (c) means connecting the inward ends of said toggle arms together for pivotal movement between said collapsed and expanded positions and wherein, in said expanded position, said toggle arms are in said overcenter position with said fastener being thereby securely locked to said structural member; and
   means for holding or supporting an object, said means being integrally connected to said second side of said elongated body member whereby said object is attached to said structural member by said holding or supporting means.

7. The fastener according to claim 6 wherein said body member further comprises means for attaching a cover member; said attaching means comprising a threaded area located on the exterior of said body member and said cover member having a corresponding threaded area on an interior surface for engagement with said body member.

8. The fastener according to claim 6 wherein said means for holding or supporting the object is a ring.

9. The fastener according to to claim 7 wherein said cover member comprises a circular disk having a central aperture which is dimensioned and threaded to correspond to the threading on the exterior of said body member.

10. A one-piece, integrally molded plastic fastener comprising:
    a base portion;
    means integrally connected to a first side of said base portion for securing an object thereto; said securing means being dimensioned and configured for contact with at least a substantial portion of the perimeter of said object; and
    expansible locking means integrally connected to a second side of said base portion and having a collasped position for insertion through an opening defined by a structural member and an overcenter expanded position to lock said fastener within said opening; whereby said object is attached to said structural member by said fastener, with said locking means comprising:
       (a) a pair of connecting arms integrally connected to said second side of said base portion and extending outwardly away therefrom;
       (b) a pair of toggle arms connected to lateral ends of said connecting arms and extending inwardly therefrom; and
       (c) means connecting the inward ends of said toggle arms together for pivotal movement between said collapsed and expanded positions and wherein, in said expanded position, said toggle arms are in said overcenter position with said fastener being thereby securely locked to said structural member.

11. The fastener of claim 10 wherein said securing means is a flexible strap.

12. The fastener of claim 10 wherein said base portion is a connecting post and said securing means is a flexible strap.

13. The fastener of claim 10 wherein said securing means comprises a hooked portion and said base portion comprises a channel portion.

14. The fastener of claim 10 wherein said securing means comprises ring means.

15. The fastener of claim 10 wherein said securing means is a hollow elongated extension and said base member further comprises a channel portion.

16. The fastener of claim 10 wherein said elongated object is a rope, wire, cable, rod, bar, stud, bolt or the like.

17. The fastener according to claim 6 wherein said means for holding or supporting the object is a hook.

18. The fastener of claim 11 wherein said flexible strap is elongated, with a first end portion thereof connected to a first side of said base portion, and a second end portion spaced from said base portion; said fastener further comprising means adjacent said base portion to secure said second end portion of said strap therein; with said base portion further including an open pathway to receive means for pushing said locking means into said expanded position, and forming a transverse slot to receive said second end portion of the strap in a close sliding fit and to urge said engaging means into pressure engagement with said base portion; said slot having opposite first and second transverse ends each adapted to receive said second end portion of the strap.

19. The fastener of claim 18 wherein:
(a) said base portion further comprises:
  (i) a bottom wall,
  (ii) a top wall, and
  (iii) means extending between said top and bottom walls to maintain the walls spaced apart; and
(b) the open pathway is formed by:
  (i) a first notch in said bottom wall, and
  (ii) a second notch in said top wall and extending over at least a portion of said first notch.

20. The fastener of claim 19 wherein said strap further comprises a series of longitudinally spaced apart openings to facilitate locking said second end portion of the strap in said slot in a range of preselected positions.

21. The fastener of claim 20 wherein said strap is integrally connected to a transverse edge of said top wall adjacent the first transverse end of the slot to facilitate inserting said second end portion of the strap into the slot through said first transverse end thereof without passing the strap over the notch in the top wall of the base portion.

22. The fastener of claim 10 wherein said flexible strap has one end integrally connected to said base portion and an opposite end extending therefrom; with a key being integrally connected to said opposite end of said strap; said integral connection of said base portion with the flexible strap including a keyway to receive said key; and said strap and key being movable between an open position, wherein the key is spaced from said keyway, and a closed position, wherein the key extends within the keyway and connects said base portion and opposite end of the strap together to form a closed loop.

23. The fastener of claim 22 wherein:
(a) said key further comprises a body having:
  (i) a main portion, and
  (ii) at least one flange extending outward from the main portion of said key body;
(b) the keyway further comprises:
  (i) a main portion for receiving said main portion of the key body, and
  (ii) at least one notch extending outward from said main portion of the keyway for receiving said at least one flange of the key body; and
(c) said at least one flange and said notch being non-aligned to facilitate holding said key body within said keyway.

24. The fastener of claim 22 wherein said keyway is located directly forward of said toggle arms; and said key further comprises a body extending outward from said strap; such that when the key and the strap are in the closed position, said key engages said toggle arms thereby holding them in the expanded position.

25. The fastener of claim 22 wherein:
(a) said key further comprises a body;
(b) said strap and said locking means form a groove for receiving an intermediate portion of the strap; and
(c) said intermediate portion of the strap has at least one strap opening for receiving said key body; such that when said key and strap are in the closed position, said intermediate portion of the strap extends within said groove, and said key body extends through said keyway and strap opening to connect said first and second ends of the strap with said intermediate portion thereof together to form a pair of closed loops.

26. The fastener of claim 25 wherein said locking means further comprises:
(a) a shoulder having an opening for receiving the key body; and
(b) a spacing flange extending between and integrally connecting together said shoulder and strap.

27. The fastener of claim 12 with said connecting post having a back end integrally connected to said expansible locking means and axially extending forward therefrom; and said flexible strap being integrally connected to and transversely extending from a front end of said connecting post, said strap having at least one opening for receiving said locking means; and said strap supporting said connecting post and expansible locking means for movement between an open position, wherein said locking means is located on a first side of and is spaced from the strap, and a closed position, wherein said locking means extends within said opening and engages a second side of the strap to connect the strap and the post together to form a closed loop.

28. The fastener of claim 27 wherein said expansible locking means further comprises a shoulder integrally connected to said connecting post; with said connecting arms extending rearward and outward away from said shoulder and integrally connected therewith.

29. The fastener of claim 13 wherein said hooked portion extends upward from and is directly supported by said channel portion; with said channel portion having a longitudinal channel opening to receive holding means to maintain said locking means in the expanded position, said channel opening being located directly below said hooked portion to facilitate using the holding means to directly support said hooked portion.

30. The fastener of claim 29 wherein said hooked portion forms an upwardly extending recess, and further comprises a flexible locking pin longitudinally projecting over said recess.

31. The fastener of claim 30 wherein:
(a) said hooked portion further comprises:
  (i) front and back upwardly extending, longitudinally spaced apart legs, (ii) a base longitudinally extending between said front and back legs, and (iii) a front reinforcing flange extending forward from said front leg and upward from said channel portion;

(b) an upper part of said front reinforcing flange forms the locking pin; and (c) said base forms a part of said channel portion.

32. The fastener of claim 14 with said base portion having first and second longitudinally extending, spaced apart legs connected to a first side thereof; with said ring means comprising an annular connecting ring connected to a second side of said base portion and forming a central aperture having an axis; and said expansible locking means being connected to said first and second legs; said axis of said connecting ring being oriented transversely to said opening.

33. The fastener of according to claim 32 wherein:

(a) said first and second legs, annular connecting ring, and locking means all are formed by an outside strip, an inside strip, and a connecting portion;

(b) said outside and inside strips are substantially parallel to and slightly spaced from each other substantially throughout their entire length;

(c) said connecting portion extends between said inside and outside strips to integrally connect those strips together; and (d) said inside and outside strips and connecting portion form:

(i) a front recess extending between said inside and outside strips and forward of said connecting portion, and (ii) a back recess extending between said inside and outside strips and rearward of said connecting portion.

34. The fastener of according to claim 33 wherein said inside strip has a substantially uniform first width.

35. The fastener of according to claim 34 wherein said expansible locking means further comprises means connecting said toggle arms to said first and second legs; with portions of said toggle arms being formed by said outside strip having a second, substantially uniform width which is greater than said first width.

36. The fastener of according to claim 35 wherein said connecting portion of the annular connection ring, first and second legs, and connecting means formed by the outside strip further comprises a third, substantially uniform width which is less than the first width.

37. The fastener of according to claim 36 wherein said connecting portion is substantially centrally located between front and back sides of said inside and outside strips.

* * * * *